US007437236B2

(12) United States Patent
Garcia et al.

(10) Patent No.: US 7,437,236 B2
(45) Date of Patent: Oct. 14, 2008

(54) METHOD FOR CUSTOMIZING THE PROPERTIES OF A DRIVE ASSEMBLY IN MOTOR VEHICLES

(75) Inventors: Patrick Garcia, Neewiller (FR); Bernd Fuhrmann, Harthausen (DE)

(73) Assignee: Heinrich Gillet GmbH, Edenkoben (DE)

( * ) Notice: Subject to any disclaimer, the term of this patent is extended or adjusted under 35 U.S.C. 154(b) by 70 days.

(21) Appl. No.: 11/716,587

(22) Filed: Mar. 12, 2007

(65) Prior Publication Data

US 2007/0209352 A1 Sep. 13, 2007

(30) Foreign Application Priority Data

Mar. 10, 2006 (DE) ...................... 10 2006 011 203

(51) Int. Cl.
*G06F 19/00* (2006.01)
*F02B 27/02* (2006.01)
*F02M 35/10* (2006.01)
*F01N 7/00* (2006.01)

(52) U.S. Cl. ..................... 701/115; 60/312; 123/184.53

(58) Field of Classification Search ................. 123/342, 123/184.21, 184.53–184.57, 198 R; 701/101, 701/102, 115; 60/312–314, 323, 324; 181/175, 181/204, 241; 180/309; 73/118.01, 118.02
See application file for complete search history.

(56) References Cited

U.S. PATENT DOCUMENTS 5,000,039 A * 3/1991 Wright et al. ............ 73/114.32
5,040,507 A * 8/1991 Hayes et al. ............. 123/339.2
5,042,444 A * 8/1991 Hayes et al. ................ 123/335
6,732,510 B2 * 5/2004 Ciray .......................... 60/312
7,267,195 B2 * 9/2007 Carlier et al. ................. 60/324
2002/0130287 A1 * 9/2002 Smith et al. ............ 251/129.15

FOREIGN PATENT DOCUMENTS

JP 07168583 A * 7/1995 ................. 701/115

* cited by examiner

*Primary Examiner*—Willis R Wolfe, Jr.
(74) *Attorney, Agent, or Firm*—Muncy, Geissler, Olds & Lowe, PLLC

(57) ABSTRACT

The object of the invention is to customize the properties of the drive assembly of motor vehicles comprising an intake system, an exhaust system, and/or an internal combustion engine. For this purpose, the mechanical properties of a serial drive assembly, the engine parameters efficiency and rotational torque, and the acoustics of the serial intake and/or exhaust system are stored in a database in an initial step. Furthermore, the construction features of the serial drive assembly that can be customized are stored in the database with their variation parameters and limitations. After varying at least one construction feature, the modifications of the engine parameters resulting therefrom are calculated and stored as a parameter difference. Likewise, the resulting changes of the acoustic features are calculated and stored as sound difference. Thereafter, the original values of the serial drive assembly are overwritten with the difference values and reproduced acoustically. If necessary, the steps from varying the construction features to the acoustic reproduction can be repeated over and over until the desired end result is obtained. The data transmission from the user to the database and back is done via Internet and/or Intranet.

10 Claims, 1 Drawing Sheet

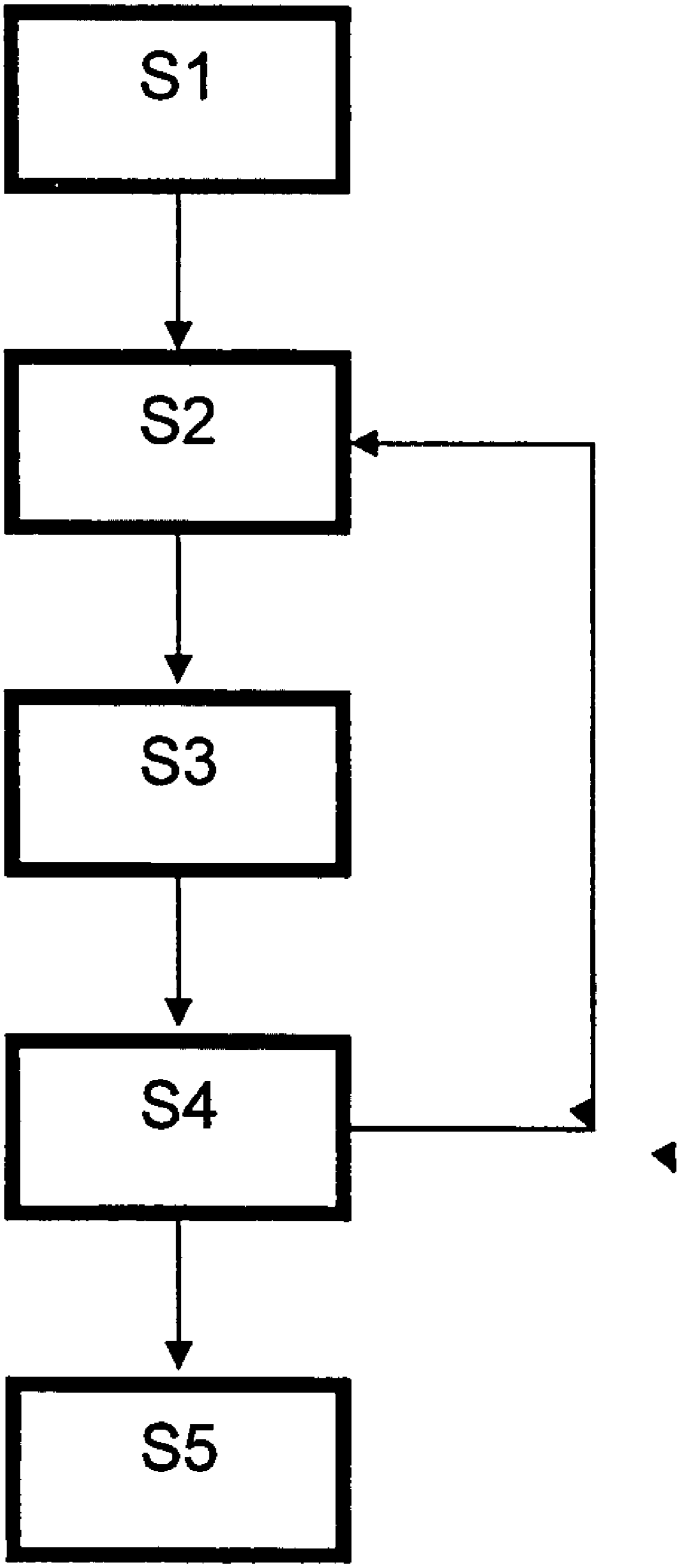
S1
S2
S3
S4
S5

METHOD FOR CUSTOMIZING THE PROPERTIES OF A DRIVE ASSEMBLY IN MOTOR VEHICLES

This nonprovisional application claims priority under 35 U.S.C. § 119(a) on German Patent Application No. DE 102006011203, which was filed in Germany on Mar. 10, 2006, and which is herein incorporated by reference.

BACKGROUND OF THE INVENTION

1. Field of the Invention

The present invention relates to a method for customizing the properties of a drive assembly in motor vehicles comprising an intake system, an exhaust system, and/or an internal combustion engine.

2. Description of the Background Art

Motor vehicles with internal combustion engines have to be equipped with intake and exhaust systems that conform to legal regulations with regard to noise suppression. Furthermore, the acoustic properties of the intake systems, and in particular the exhaust systems, are tuned to a certain sound so that the consumer in the street can recognize from a distance, which automobile model from which manufacturer is passing by.

This sound design is implemented by the designers of the car manufacturers in collaboration with the designers of their suppliers. The parameters efficiency and rotational moment of the engine are thereby influenced and determined. As a result, vehicles of a certain type, that is, model, generate the same sound and have identical engine parameters.

However, many car owners find this uniformity unsatisfactory. Thus, they are constantly looking for alternatives. However, the options in the industry are limited, particularly regarding alternatives to intake and exhaust systems. Do-it-yourself projects are hardly possible because all components used in a motor vehicle require a model permit or an individual permit so that the operating license will not be forfeited.

SUMMARY OF THE INVENTION

It is therefore an object of the present invention to provide a method that allows the owner of a motor vehicle to customize the properties of a serial drive assembly while preserving the operating license.

This objective is met by a method, whereby the mechanical properties of a serial drive assembly are stored in a database; the engine parameters efficiency and rotational torque are stored in the database; the acoustic properties of the serial intake system and/or exhaust system are stored in the database, both in the frequency and in the time field; the construction features of the serial drive assembly that can be customized are stored in the database; the parameters and limitations of the variation are stored in the database; after varying at least one construction feature, from the resulting modifications the engine parameters are calculated and stored as parameter difference and/or the acoustic properties in the frequency field are calculated and are transformed as a sound difference in the time domain; the original values of the serial drive assembly are overwritten by the difference values and reproduced; the steps from varying the construction characteristics to reproduction are repeated, if necessary; the drive assembly is realized with the varied construction features; the variation of the construction features and the visual and/or acoustic reproduction are realized by data transmission via the Internet and/or an Intranet.

The present invention is based on the idea to provide the end user, who is sitting at his/her computer at home and has access to a data connection, with defined options based on the original serial drive assembly so that he/she is able to customize certain constructive features of the motor vehicle system, the features being specified by the manufacturer. These can be eight features, for example. Starting with this mechanical variation, the resulting modifications of the engine parameters efficiency and rotational torque and/or acoustics are calculated in the electronic data processing system of the manufacturer. The default data of the original serial drive assembly is overwritten with these modifications, is transmitted electronically to the end user, and is displayed there, that is, replayed. The end user can repeat this process over and over until satisfied with the acoustic result. In this event, he/she will place an order. The selected variations of the mechanical features are realized at the manufacturer's plant, and the individual part is delivered to the purchaser and/or his/her repair shop.

According to an embodiment, the exit noise from the exhaust system is used as an acoustic feature. This is recorded with a microphone, is converted into an electrical signal, and is analyzed by a frequency analysis device.

Essentially, all components of an exhaust system can be varied, beginning with the manifold all the way to the tail pipe. It is beneficial to vary the mechanical features of the end muffler since it has the greatest influence on the acoustic sound characteristics of the exhaust noise.

For the same reason, the mechanical features of the intake silencer are varied if the intake noise is to be customized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the FIGURE illustrates a flow chart for customizing at least one property of a drive assembly.

DETAILED DESCRIPTION

The FIGURE illustrates a method for varying an audible exhaust acoustic property of a motor vehicle. In step S1 a database is provided having specifications of an intake system and/or an exhaust system of the motor vehicle stored therein. In step S2 a construction parameter of the intake system or the exhaust system is adjusted by a user. In step S3 the audible exhaust acoustic property is determined based on the adjusted construction parameters. In step S4 the determined audible exhaust acoustic property is transmitted to a user, whereby the user can repeatedly adjust the construction parameters until a desired acoustic exhaust property is achieved. Once the user is satisfied with the exhaust acoustic properties, in step S5 the intake system or the exhaust system is manufactured based on the construction parameters selected by the user.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for customizing properties of a drive assembly in motor vehicles comprised of an intake system, an exhaust system, and/or an internal combustion engine, the method comprising:

storing mechanical properties of a serial drive assembly in a database;

storing engine parameters efficiency and rotational torque in the database;

storing acoustic properties of a serial intake and/or exhaust system in the database, each in a frequency field and a time field;

construction properties of the serial drive assembly that are customizable are stored in the database;

parameters and limitations of variations are stored in the database;

after varying at least one construction feature, the resulting modifications of the engine parameters are calculated and stored as a parameter difference and/or the acoustic properties in the frequency field are calculated and are stored as a sound difference in the time field;

overwriting original values of the serial drive assembly with the difference values;

repeating, if necessary, the steps from varying the construction features to reproducing them; and producing the drive assembly with the modified construction features;

wherein the variation of the construction features and the visual and/or acoustic reproduction are realized by data transmission via Internet and/or an Intranet.

2. The method according to claim 1, wherein the acoustic property is an exit noise of the exhaust system.

3. The method according to claim 1, wherein the mechanical properties of a muffler are varied.

4. The method according to claim 1, wherein the mechanical properties of an intake silencer are varied.

5. A method for varying an audible exhaust acoustic property of a motor vehicle, the method comprising:

providing a database having specifications of an intake system and/or an exhaust system of the motor vehicle stored therein;

adjusting a construction parameter of the intake system or the exhaust system by a user;

determining the audible exhaust acoustic property based on the adjusted construction parameters;

transmitting the determined audible exhaust acoustic property to the user, the user repeatedly adjusting the construction parameters until a desired acoustic exhaust property is achieved; and manufacturing components for the intake system or the exhaust system based on the construction parameters selected by the user.

6. The method according to claim 5, wherein the database further includes engine specifications of the motor vehicle.

7. The method according to claim 6, wherein the engine specifications include horsepower and/or torque.

8. The method according to claim 5, wherein the database further includes predetermined limiting parameters for varying the intake system and the exhaust system.

9. The method according to claim 5, wherein the user adjusts the construction parameters via the internet.

10. The method according to claim 5, wherein the transmitted determine audible exhaust acoustic property is audibly reproduced by the user.

* * * * *